(12) United States Patent
Corvin

(10) Patent No.: US 9,538,256 B2
(45) Date of Patent: *Jan. 3, 2017

(54) METHODS AND SYSTEMS FOR FORCED ADVERTISING

(71) Applicant: Rovi Guides, Inc., Santa Clara, CA (US)

(72) Inventor: Johnny B. Corvin, Jenks, OK (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/837,430

(22) Filed: Aug. 27, 2015

(65) Prior Publication Data

US 2016/0066058 A1    Mar. 3, 2016

Related U.S. Application Data

(63) Continuation of application No. 12/911,576, filed on Oct. 25, 2010, now Pat. No. 9,137,491, which is a
(Continued)

(51) Int. Cl.

| H04N 21/6543 | (2011.01) |
| H04N 21/44 | (2011.01) |
| G06Q 30/02 | (2012.01) |
| H04N 5/445 | (2011.01) |
| H04N 5/76 | (2006.01) |
| H04N 5/775 | (2006.01) |
| H04N 7/16 | (2011.01) |
| H04N 21/433 | (2011.01) |

(Continued)

(52) U.S. Cl.
CPC ......... *H04N 21/6543* (2013.01); *G06Q 30/02* (2013.01); *H04N 5/445* (2013.01); *H04N 5/76* (2013.01); *H04N 5/775* (2013.01); *H04N 7/165* (2013.01); *H04N 21/4331* (2013.01); *H04N 21/4383* (2013.01); *H04N 21/44* (2013.01); *H04N 21/44004* (2013.01); *H04N 21/44016* (2013.01); *H04N 21/458* (2013.01); *H04N 21/6587* (2013.01); *H04N 21/812* (2013.01); *H04N 21/478* (2013.01)

(58) Field of Classification Search
None
See application file for complete search history.

(56) References Cited

PUBLICATIONS

Johnny B. Corvin, U.S. Appl. No. 12/911,576, filed Oct. 25, 2010.
(Continued)

*Primary Examiner* — Justin Shepard
(74) *Attorney, Agent, or Firm* — Ropes & Gray LLP

(57) ABSTRACT

Methods and systems for forced advertising are provided. These methods and systems determine when a forced advertisement is to be presented, determine what forced advertisement is to be presented, and control how the forced advertisement is to be presented. A forced advertisement may be received prior to the time at which the forced advertisement is to be presented or when needed. The forced advertisement may be presented when certain broadcast advertisements are being broadcast, at certain times of the day, or at certain times within a program. The forced advertisements may be selected based upon content of a replaced broadcast advertisement, content of a nearby program, or independently of any broadcast-related factors. Finally, forced advertisements may be presented so that a television viewer cannot escape viewing the advertisement by changing channels or turning off the television.

20 Claims, 4 Drawing Sheets

Related U.S. Application Data continuation of application No. 12/481,484, filed on Jun. 9, 2009, now abandoned, which is a continuation of application No. 09/775,115, filed on Feb. 1, 2001, now abandoned.

(60) Provisional application No. 60/179,551, filed on Feb. 1, 2000.

(51) Int. Cl.
  *H04N 21/438* (2011.01)
  *H04N 21/458* (2011.01)
  *H04N 21/6587* (2011.01)
  *H04N 21/81* (2011.01)
  *H04N 21/478* (2011.01)

(56) References Cited

PUBLICATIONS

Johnny B. Corvin, U.S. Appl. No. 12/481,484, filed Jun. 9, 2009.
Johnny B. Corvin, U.S. Appl. No. 09/775,115, filed Feb. 1, 2001.

METHODS AND SYSTEMS FOR FORCED ADVERTISING

CROSS REFERENCE TO RELATED APPLICATIONS

This application is a continuation of U.S. patent application Ser. No. 12/911,576, filed Oct. 25, 2010, currently pending, which is a continuation of U.S. patent application Ser. No. 12/481,484, filed Jun. 9, 2009, now abandoned, which is a continuation of U.S. patent application Ser. No. 09/775,115, filed Feb. 1, 2001, now abandoned, which claims the benefit of U.S. provisional application No. 60/179,551, filed Feb. 1, 2000 each of which are hereby incorporated by reference herein in their entirety.

BACKGROUND OF THE INVENTION

This invention relates to television advertising. More particularly, this invention relates to methods and systems for providing forced advertisements to viewers.

Television viewers are currently exposed to a wide variety of advertising when watching most non-premium television channels. This advertising is typically presented to promote an advertiser's products and services and, at the same time, sponsor or subsidize the cost of providing television programming. Television advertising in this way is generally viewed as a highly effective means of promoting products and services, but is also recognized as being very expensive.

One problem with television advertising is that television viewers frequently change channels as soon as a television advertisement appears. This act is colloquially known as "channel surfing." Recent technologies have also facilitated skipping commercials when programs are buffered by or stored on personal video recorders which digitally store programs on disk drives. For example, when a program is stored on a disk drive of a personal video recorder, a television viewer may press a button that causes the recorded program to jump in thirty second increments and thereby skip the typical thirty second commercial.

Another problem with television advertising is that television broadcasters typically have exclusive control of the advertisements that are shown on a corresponding channel viewed by a television viewer. This prevents a television distributors, such as cable and satellite television companies, from being able to provide alternate advertising to the television viewer.

Thus, it is desirable to provide methods and systems for forcing advertisements on viewers. Such methods and systems preferably facilitate preventing viewers from changing channels away from, or skipping, television advertisements. These methods and systems also preferably facilitate providing alternative advertising from that provided by television broadcasters to television viewers.

SUMMARY OF THE INVENTION

These and other objects of the invention are accomplished in accordance with the principle of the present invention by providing methods and systems for forced advertising.

In accordance with the invention, these methods and systems provide forced advertising by determining when a forced advertisement is to be presented, by determining what forced advertisement is to be presented, and by controlling how the forced advertisement is to be presented. A forced advertisement may be received prior to the time at which the forced advertisement is to be presented. Alternatively, the forced advertisement may be received when needed. The forced advertisement may be presented when certain broadcast advertisements are being broadcast, at certain times of the day, or at certain times within a program. The forced advertisements may be selected based upon content of a replaced broadcast advertisement, content of a nearby program, or independently of any broadcast-related factors. Finally, forced advertisements may be presented so that a television viewer cannot escape viewing the advertisement by changing channels or turning off the television.

BRIEF DESCRIPTION OF THE DRAWINGS

These and other objects and advantages of the invention will become apparent upon reading the following detailed description and upon reference to the drawings in which.

DETAILED DESCRIPTION OF THE PREFERRED EMBODIMENTS

Figure 1:
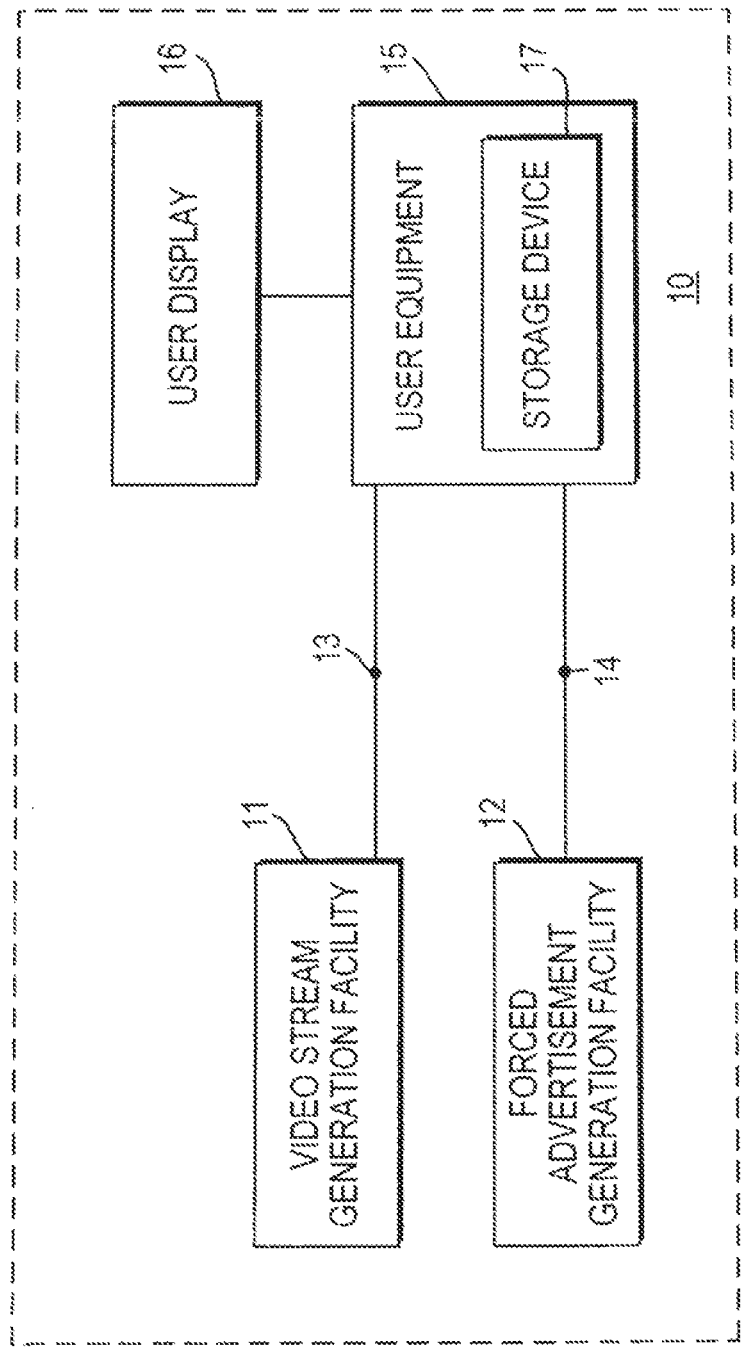
FIG. 1 is a block diagram illustrating hardware that may be used in various embodiments of the present invention.

An illustrative system 10 in accordance with the present invention is shown in FIG. 1. As illustrated, system 10 may include a video stream generation facility 11, a forced advertisement generation facility 12, communication links 13 and 14, user equipment 15, and a user display 16. Video stream generation facility 11 may be used to provide video streams. A video stream may include television, cable, Internet or other suitable media signals with video audio, data, etc. components which, when received by user equipment, may be used to provide suitable display on a user display. Video stream generation facility 11 may include television broadcast equipment, video tape players, video and data servers, etc.

Forced advertisement generation facility 12 may be used to provide forced advertisements. Like video streams, forced advertisements may include television, cable, Internet or other suitable media signals with video, audio, data, etc. components which, when received by user equipment, may be used to provide suitable display on a user display. Forced advertisement generation facility 11 may include television broadcast equipment, video tape players, video and data servers, etc.

System 10 may include multiple video stream generation facilities 11 as well as multiple forced advertisement generation facilities 12, but only one of each has been shown to avoid over-complicating the drawing. Additionally, video stream generation facility 11 and forced advertisement generation facility 12 may be at the same location, such as at a cable head-end, and/or may be combined.

Communications links 13 and 14 may be used to transmit video streams and forced advertisements to user equipment, and may include, for example, a satellite link, a telephone network link, a cable or fiber optic link, a microwave link, an Internet link, a data-over-cable service interface specification link, a combination of such links or any other suitable communications link.

The video streams and the forced advertisements, once transmitted through links 13 and 14, may then by received by user equipment 15. User equipment 15 may be implemented using a set-top box, a personal computer, a personal video recorder, or any other suitable equipment containing a processor or several processors. If desired, a combination of such arrangements may be used. Both the video streams and the forced advertisements may be shown to a user on a user display 16. The user display 16 may be integrated into the same enclosure as user equipment 15.

User equipment 15 may also include a storage device 17. Storage device 17 may be any suitable storage device such as a hard disk drive, a video tape drive, a rewritable compact disc or combination of such devices suitable for storing forced advertising. The storage device 17 may be capable of storing several hours of video streams (e.g., movies, television shows, sporting events, etc.) and forced advertisements (e.g., television commercials including video and audio, barker channel promotions, text, graphics, etc.).

Figure 2:
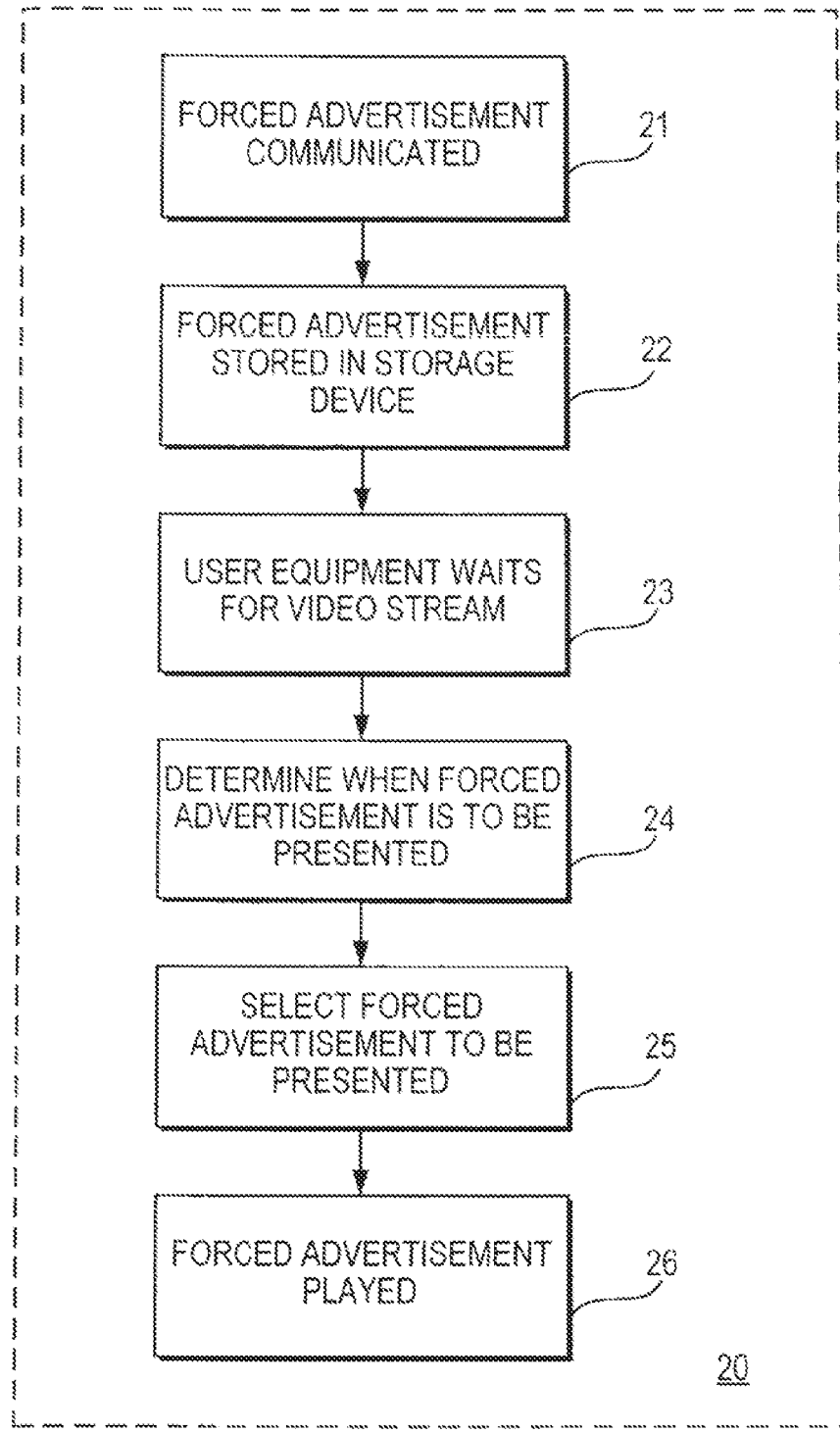
FIG. 2 is a flow chart of a process in accordance with one embodiment of the present invention in which a forced advertisement is retained in a storage device contained within user equipment.

One embodiment of a process 20 for forcing advertisements that may be implemented using system 10 is shown in FIG. 2. As illustrated, at step 21, a forced advertisement may be communicated from forced advertisement generation facility 12 to storage device 17 in user equipment 15 at times such as initial set-up of user equipment 15, when the user equipment 15 is turned on, at set time intervals, etc. The forced advertisement may then be stored in storage device 17 at step 22 for subsequent play. Next, at step 23, user equipment 15 may wait for a video stream to be presented to the television viewer. A video stream may be presented to a television viewer upon the viewer tuning to a desired television channel, for example. Once a video stream is being presented, process 20 may determine at step 24 whether a forced advertisement is to be presented.

Whether a forced advertisement is to be presented may be based upon any suitable factor or factors. For example, a forced advertisement may be presented Whenever a certain advertisement is included in the video stream—such as whenever a Pepsi advertisement is detected. Advertisements may be detected using programming tags or data, using close captioning data, or using any other suitable method. As another example, a forced advertisement may be presented at certain times within a broadcast—such as approximately 15 minutes into a program or during the third commercial break of a program. As still another example, a forced advertisement may be presented at a certain time or certain times of the day—such as at the top of each hour. Any other suitable method for selecting when and which advertisements are to be presented may be used.

In an alternative embodiment, the forced advertisement that is presented may be the same advertisement or a slightly modified version of the advertisement that is being replaced. For example, the forced advertisement may be for the same advertiser as the original advertisement or may be a version of the advertisement that has been determined to be of higher interest to the specific viewer or household.

Once a forced advertisement is determined to be presented at step 24, process 20 may next select which forced advertisement to be presented at step 25. Any suitable method for selecting which forced advertisement is to be presented may be used. For example, when certain advertisements are detected, a competitor advertisement may then be selected to be presented as the forced advertisement. Thus, when a Pepsi advertisement is detected, a Coca Cola advertisement may be forced. As another example, forced advertisements may be selected based upon program content that is broadcast near in time to the forced advertisement. Thus, when a forced advertisement is to be presented as the third advertisement of every television program, the forced advertisement may be for beer when presented during a football game and for golf clubs when presented during a golf tournament. The content of the program may be determined from program tags or guide data, from closed captioning data, or using any other suitable method.

Finally, once a forced advertisement is selected at step 25, the forced advertisement may be presented at step 26. Playing of the forced advertisement at step 26 may include preventing the television viewer from escaping the advertisement by switching channels, or even turning off the user equipment. For example, if the viewer attempts to switch to a different video stream channel during a forced advertisement (e.g., channel surfing), the user equipment may switch to the new channel but the forced advertisement may continue to play until completion or, alternatively, the advertisement play would have to be completed before the channel switch can occur. As another example, if the user turns off the user equipment 15 during the forced advertisement display, when the user turns the user equipment 15 back on, the forced advertisement may continue to be displayed until completion or it may replay from the beginning.

Forced advertisements may be presented at any point in a television program irrespective of whether another advertisement is being broadcast. To do this, a nearby television program may be buffered in storage device 17. For example, if a forced advertisement is to be presented at 7:15 pm during a television program, but no other advertisement is to be aired at that time, the invention may buffer the program while the forced advertisement is being presented, and then later remove a broadcast advertisement and unbuffer the program to make up the lost time.

Forced advertisements may be integrated into the video and/or audio of a television program broadcast or may be presented in a separate window. For example, a forced advertisement may be presented in a normal commercial break so that the television viewer has no idea that a forced advertisement is being presented. Alternatively, as another example, a forced advertisement may be presented in a window overlaying all or a portion of the television program broadcast.

Figure 3:
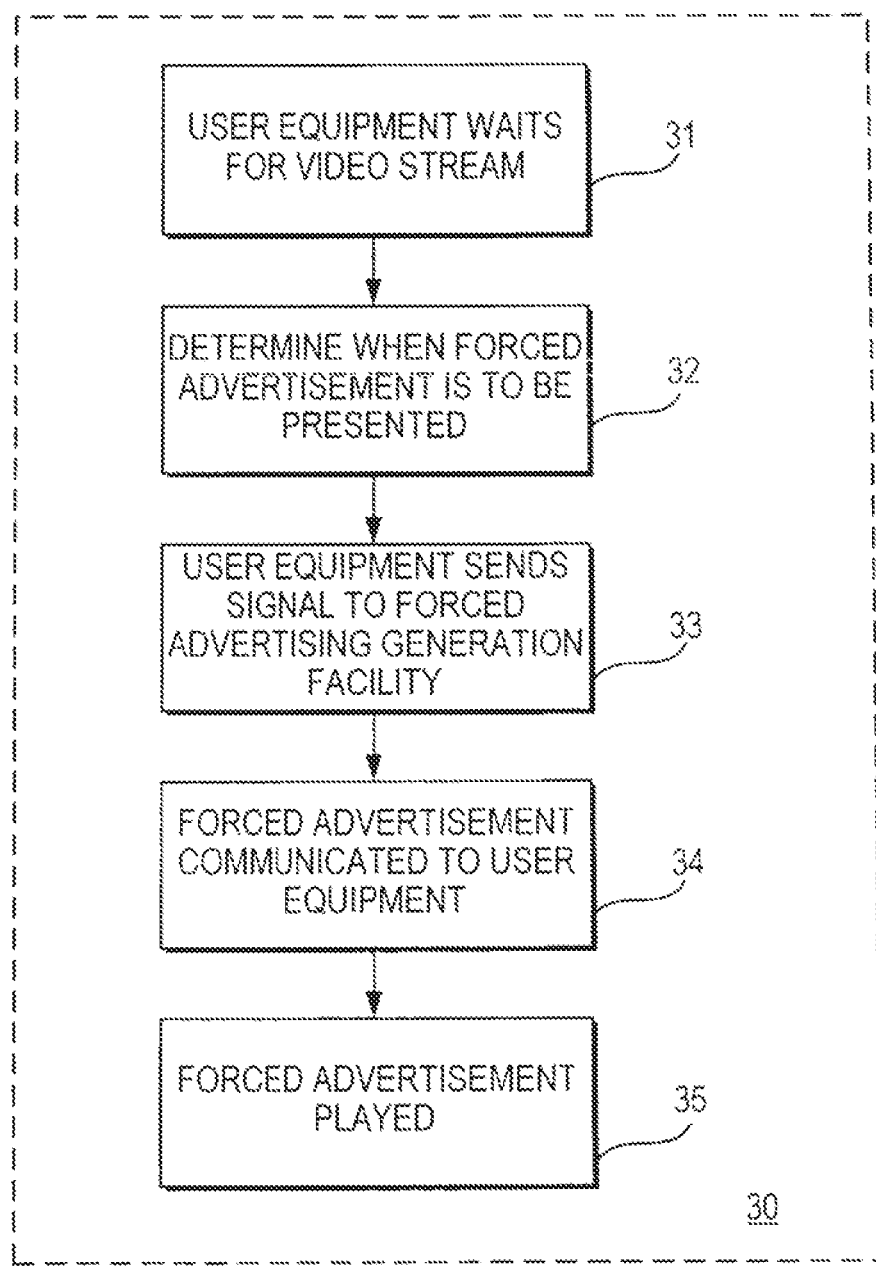
FIG. 3 is a flow chart of a process in accordance with one embodiment of the present invention in which a forced advertisement is transmitted from a forced advertising generation facility.

Turning to FIG. 3, another process 30 for forcing advertisements that may be implemented using user equipment 15 in accordance with one embodiment of the present invention is shown. As illustrated, at step 31, process 30 may wait for a video stream to be received. Step 31 may be substantially the same as step 23 described above. Next, at step 32, process 30 may determine when a forced advertisement is to be presented. Step 32 may be substantially the same as step 24 described above. At step 33, process 30 may then send a signal to forced advertisement generation facility 12 requesting that a forced advertisement be provided. Facility 12 may then select an advertisement to be presented in any suitable fashion, for example, as explained in connection with step 25 above. Then, at step 34, forced advertisement generation facility 12 may transmit a forced advertisement to user equipment 15. This forced advertisement may finally be presented at step 35. Step 35 may present the forced advertisement in substantially the same manner as described above in connection with step 26.

Figure 4:
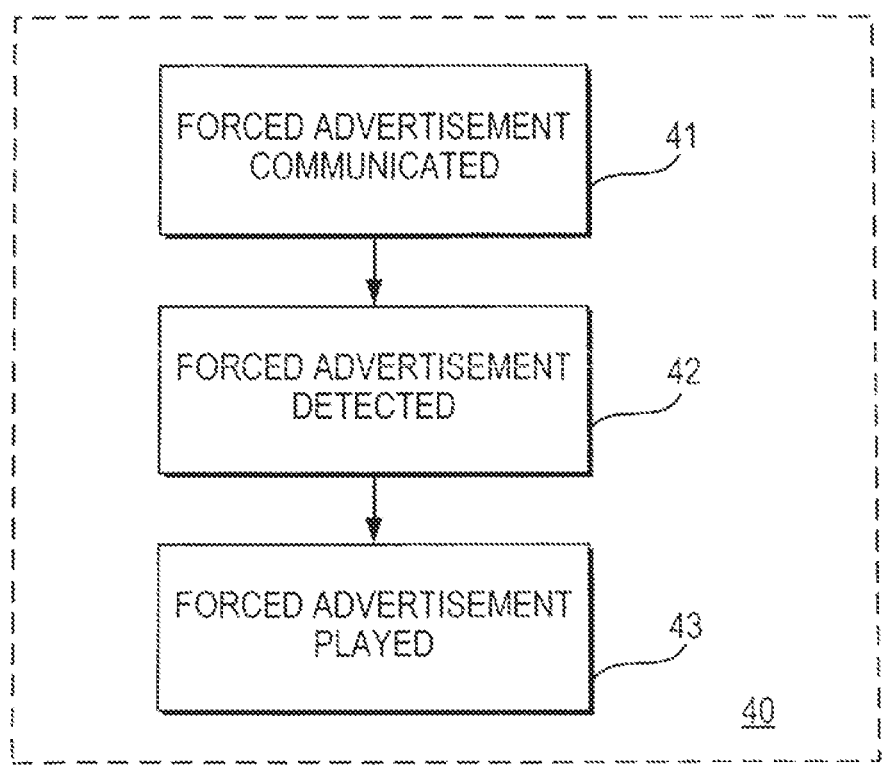
FIG. 4 is a flow chart of a process in accordance with one embodiment of the present invention in which an incoming advertisement is designated as a forced advertisement.

Turning to FIG. 4, another process 40 for detecting a forced advertisement in an incoming video stream for play or replay in accordance with one embodiment of the present invention is shown. As illustrated, at step 41, process 40 may wait for a video stream to be received. Next, at step 42, an incoming advertisement which has been designated as a forced advertisement may be received and identified. The identification may be based upon detecting designations in the forced advertisements, such as programming tags or data or close captioning data, may be based upon information stored in programming data, may be based upon a time at which an advertisement is received, may be based upon a channel on which an advertisement is received, etc., or any combination of the same. At step 43, the forced advertisement may then be played. Playing of the forced advertisement at step 43 may include preventing the television viewer from switching channels while the forced advertisement is playing. Additionally, at step 43, forced advertisements may be stored in the storage device 17 of user equipment 15, if desired. This may then allow the presentation of the forced advertisement in substantially the same manner as step 26, that is, the forced advertisement play may recommence or restart if the channel is switched or if the user equipment 15 is turned on and off.

In addition to providing forced advertising, user equipment 15 may also be used to present an electronic program guide. In one embodiment, the electronic program guide may be an interactive television program guide in order to facilitate selecting programs to be viewed. Illustrative interactive television program guides are described, for example, in Knee et al. U.S. Pat. No. 5,589,892, issued Dec. 31, 1996, and Knudson et al. U.S. patent application Ser. No. 09/357, 941, filed Jul. 16, 1999, which are hereby incorporated by reference herein in their entireties.

Thus, it is apparent that there has been provided, in accordance with the invention, a forced advertising system that fully satisfies the objects, aims and advantages set forth above. While the invention has been described in conjunction with specific embodiments thereof, it is evident that many alternatives, modifications and variations as fall within the spirit of the appended claims.

What is claimed is:

1. A method for generating a display of alternate media content, the method comprising:
receiving a video stream and a plurality of alternate media content;
generating a display of the video stream on a user equipment, wherein the video stream comprises an advertisement and a first video stream length;
determining that the advertisement is scheduled to be generated for display after a playback position;
selecting an alternate media content of the plurality of alternate media content based on an association between the alternate media content and at least one of the advertisement, the video stream, and a user associated with the user equipment;
inserting the alternate media content at the playback position in the video stream;
removing the advertisement from the video stream to generate a second video stream length that is substantially the same as the first video stream length; and
automatically reverting to generating the display of the video stream from the playback position.

2. The method of claim 1, wherein the advertisement is a first advertisement and the alternate media content is a second advertisement.

3. The method of claim 1, further comprising:
receiving the video stream from a first media content source; and
receiving the alternate media content from a second media content source that is different from the first media content source.

4. The method of claim 1, wherein generating the display of the alternate media content further comprises generating the display at a time that is relative to the first video stream length.

5. The method of claim 1, wherein selecting the alternate media content based on an association between the alternate media content and the video stream further comprises:
determining program content in the video stream based on program tags, guide data, or closed captioning data associated with the video stream; and
selecting the alternate media content associated with the program content in the video stream.

6. The method of claim 1, wherein generating the display of the alternate media content further comprises generating the display while buffering the video stream.

7. The method of claim 1, wherein the playback position is a first playback position, and wherein generating the display of the alternate media content further comprises:
determining that the user equipment has been turned on after being turned off during the display of the alternate media content; and
generating the display of the video stream from a second playback position corresponding to a beginning of the alternate media content.

8. The method of claim 1, wherein the playback position is a first playback position, and wherein generating the display of the alternate media content further comprises:
receiving a user request to change a channel during the display of the alternate media content; and
generating the display of the video stream from a second playback position corresponding to a beginning of the alternate media content.

9. The method of claim 1 wherein the playback position corresponds to a beginning of the advertisement in the video stream.

10. The method of claim 1, wherein selecting the alternate media content based on an association between the alternate media content and the advertisement further comprises:
determining content in the advertisement based on program tags, guide data, or closed captioning data associated with the video stream;
selecting a modified version of the advertisement based on the content in the advertisement and an interest of the user of the user equipment; and
using the modified version of the advertisement as the alternate media content.

11. A system for generating a display of alternate media content, the system comprising:
a processor configured to:
receive a video stream and a plurality of alternate media content;
generate a display of the video stream on user equipment, wherein the video stream comprises an advertisement and a first video stream length;
determine that the advertisement is scheduled to be generated for display after a playback position;
select an alternate media content of the plurality of alternate media content based on an association between the alternate media content and at least one of the advertisement, the video stream, and a user associated with the user equipment;
insert the alternate media content at the playback position in the video stream;

remove the advertisement from the video stream to generate a second video stream length that is substantially the same as the first video stream length; and automatically revert to generating the display of the video stream from the playback position.

12. The system of claim 11, wherein the advertisement is a first advertisement and the alternate media content is a second advertisement.

13. The system of claim 11, wherein the processor is further configured to:

receive the video stream from a first media content source; and receive the alternate media content from a second media content source that is different from the first media content source.

14. The system of claim 11, wherein the processor configured to generate the display is further configured to generate the display at a time that is relative to the first video stream length.

15. The system of claim 11, wherein the processor configured to select the alternate media content based on an association between the alternate media content and the video stream is further configured to:

determine program content in the video stream based on program tags, guide data, or closed captioning data associated with the video stream; and select the alternate media content associated with the program content in the video stream.

16. The system of claim 11, wherein the processor configured to generate the display is further configured to generate the display while buffering the video stream.

17. The system of claim 11, wherein the playback position is a first playback position, and wherein the processor configured to generate the display of the alternate media content is further configured to:

determine that the user equipment has been turned on after being turned off during the display of the alternate media content; and generate the display of the video stream from a second playback position corresponding to a beginning of the alternate media content.

18. The system of claim 11, wherein the playback position is a first playback position, and wherein the processor configured to generate the display of the alternate media content is further configured to:

receive a user request to change a channel during the display of the alternate media content; and generate the display of the video stream from a second playback position corresponding to a beginning of the alternate media content.

19. The system of claim 11 wherein the playback position corresponds to a beginning of the advertisement in the video stream.

20. The system of claim 11, wherein the processor configured to select the alternate media content based on an association between the alternate media content and the advertisement is further configured to:

determine content in the advertisement based on program tags, guide data, or closed captioning data associated with the video stream;

select a modified version of the advertisement based on the content in the advertisement and an interest of the user of the user equipment; and use the modified version of the advertisement as the alternate media content.

* * * * *